(12) United States Patent
Yu et al.

(10) Patent No.: US 10,585,840 B2
(45) Date of Patent: Mar. 10, 2020

(54) INTERFACE CIRCUIT, SIGNAL TRANSMISSION SYSTEM AND SIGNAL TRANSMISSION METHOD THEREOF

(71) Applicant: Suzhou Bayhub Electronics Co., Ltd., Suzhou (CN)

(72) Inventors: Xiaoguang Yu, Suzhou (CN); Lijun Liu, Suzhou (CN)

(73) Assignee: SUZHOU BAYHUB ELECTRONICS CO., LTD., Suzhou, Jiangsu Province (CN)

( * ) Notice: Subject to any disclaimer, the term of this patent is extended or adjusted under 35 U.S.C. 154(b) by 0 days.

(21) Appl. No.: 15/939,057

(22) Filed: Mar. 28, 2018

(65) Prior Publication Data

US 2018/0293201 A1    Oct. 11, 2018

(30) Foreign Application Priority Data

Apr. 7, 2017    (CN) .......................... 2017 1 0224557

(51) Int. Cl.
*G06F 13/16* (2006.01)
*G06F 13/42* (2006.01)
*G06F 3/06* (2006.01)

(52) U.S. Cl.
CPC ...... *G06F 13/4243* (2013.01); *G06F 13/1689* (2013.01); *G06F 13/4217* (2013.01); *G06F 3/0601* (2013.01); *Y02D 10/14* (2018.01)

(58) Field of Classification Search
CPC .. G06F 13/4243; G06F 3/0601; G06F 1/0328; G06F 1/0335; G06F 1/01; G06F 13/1689; G06F 13/4217; Y02D 10/14
See application file for complete search history.

(56) References Cited

U.S. PATENT DOCUMENTS

2017/0031845 A1*    2/2017    Tzafrir ................ G06F 13/1668

* cited by examiner

*Primary Examiner* — Ernest Unelus
(74) *Attorney, Agent, or Firm* — Muncy, Geissler, Olds & Lowe, P.C.

(57) ABSTRACT

An interface circuit provides communication between a memory card and a host device which use a half duplex communication protocol. The interface circuit switches communication direction between the host device and memory card by analyzing interface protocol. The interface circuit includes a sending packet analyzing module which receives a first signal packet from the host device and obtains working status of the host device and memory card by analyzing the first signal packet, a bus direction control module coupled to the sending packet analyzing module which generates a first control signal according to a first parameter in the first signal packet which includes conducting direction information indicating the host device between the memory card, and a direction switching module coupled to the bus direction control module which controls the conducting direction of the pathway between the host device and memory card according to the first control signal.

6 Claims, 4 Drawing Sheets

INTERFACE CIRCUIT, SIGNAL TRANSMISSION SYSTEM AND SIGNAL TRANSMISSION METHOD THEREOF

RELATED APPLICATION

This application claims priority to the benefit of Chinese Patent Application Number 201710224557.7, filed on Apr. 7, 2017 with State Intellectual Property Office of the P.R. China (SIPO)", all of which are fully incorporated herein by reference.

TECHNICAL FIELD

The present invention relates to the technical field of circuits, especially relates to an interface circuit, a signal transmission system and signal transmission method.

BACKGROUND

The conventional host device communicates with the memory card using a half duplex communication protocol to perform directional transfers alternately. In other words, at a time, one pathway can transfers information in one direction. During half duplex communication protocol, the pathway should change transfer direction frequently by switching the direction of the pathway. In conventional half duplex communication, the direction of the pathway is changed by detecting a signal edge to perform switch, i.e., if the signal is changed from a low level to a high level, the transfer direction of the pathway is triggered to switch. Disadvantageously, the conventional method of switching the direction of the pathway is reasonable for the low speed half duplex communication and is not applicable for high speed communication. Also, it is difficult and expensive to solve the problems in high speed communication, and the interface circuit of the timing cannot be required.

FIG. 1 shows a conventional interface circuit 104 for a host device 102 to communicate with a memory card 106 in a legacy mode, for example a secure digital (SD) card, a universal flash storage (UFS) card, multimedia card (MMC), where the host device 102, the interface circuit 104 and the memory card 106 compose a signal transmission system 100. Specifically, the host device 102 can operates on the memory card 106 with many kinds of mode via the interface circuit 104, for example, reads data from or writes data to the memory card 106. As shown in FIG. 1, the interface circuit 104 includes a input mode 1041 for receiving signals from the host device 102, and sending the signal to a signal edge detection module 1043, the signal transferred from the host device 102 to the interface circuit 104 includes, but is not limited to, a clock signal, a command signal or a data signal. The signal edge detection module 1043 detects if the signal has a change, for example, the signal is changed from a high level to a low level or from a low level to a high level. When the signal edge detection module 1043 detects changes from the signal, the interface circuit 104 turns on the pathway between the host device 102 and the memory card 106, i.e., the signal is transferred to the memory card 106 via an output module 1045. On the contrary, when the memory card 106 sends signal to the host device 106, such as the host device 106 reads data signal on the memory card 106, the input module 1042 receives the data signal from the memory card, and sends the data signal to signal edge detection module 1044 for detecting. It should be understood that the framing and function of signal edge detection module 1044 is same as the signal edge detection module 1043. By the way of an example, when the signal edge detection module 1044 detects changes of the signal from the memory card 106, the interface circuit 104 turns on the pathway between the host device 102 and the memory card 106, i.e., the signal is transferred from the memory card 106 to the host device 102 via an output module 1046.

As described above, During the host device 102 communicates with the memory card 106 via the interface circuit 104, if the host device 102 communicates with the memory card 106 in a high speed mode, the signal edge detection module 1043 and/or the signal edge detection module 1044 need to detect the changes of the signal by using a higher speed detecting circuit which increases the design cost of the interface circuit. Moreover, the conventional interface circuit 104 has shortcomings of poor anti-noise. As the signal passes each module in the interface circuit 104 which will create data transmission delay, and the signal may not be sampled correctly. For example, when the signal transfers from one end to another end (i.e., from host device to the memory card), the signal may delay differently in each module, it may causes that the length of the effective sampling window is very short and cannot satisfy the timing requirements, then the signal cannot be sampled correctly. Lastly, the timing requirement is not same during the memory card 106 works in a different mode. The conventional interface circuit 104 cannot adjust the timing to satisfy the timing requirement when in all kinds of modes. So, an interface circuit can satisfy timing requirements when the host device communicates with the memory card in all kinds of mode is necessary.

SUMMARY

The present invention disclose an interface circuit for providing communication between a memory card and a host device, said host device and said memory card uses a half duplex communication protocol based on said interface circuit, and said interface circuit configured to switch direction of communication between said host device and said memory card by analyzing interface protocol, said interface circuit comprising: a sending packet analyzing module, configured to receive a first signal packet from said host device, and obtain working state of said host device and said memory card by analyzing said first signal packet; a bus direction control module, coupled to said sending packet analyzing module, configured to generate a first control signal according to a first parameter in said first signal packet, wherein said first signal packet includes conducting direction information indicating said host device between said memory card; and a direction switching module, coupled to said bus direction control module, configured to turn on pathway between said host device and memory card according to said first control signal.

The present invention also provide a signal transmission system, comprising: a host device, an interface circuit and a memory card, said host device and said memory card uses a half duplex communication protocol based on said interface circuit, and said interface circuit configured to switch direction of communication between said host device and said memory card by analyzing interface protocol, where the host device sends a first signal packet to said interface circuit for analyzing; the interface circuit coupled to said host device, configured to analyze said first signal packet to obtain a conducting direction information between said host device and said memory card, where said interface circuit includes: a sending packet analyzing module, configured to receive said first signal packet from said host device and obtain the working state of said host device and said memory card by analyzing said first signal packet; a bus direction control module, coupled to said sending packet analyzing module, configured to generate a first control signal according to a first parameter in said first signal packet, wherein said first signal packet includes conducting direction information indicating said host device between said memory card; and a direction switching module, coupled to said bus direction control module, configured to turn on pathway between said host device and memory card according to said first control signal; and the memory card returns said second signal packet to said interface circuit.

The present invention also provide a method for providing communication between a host device and a memory card, including: sending a first signal packet from said host device to said memory card; analyzing said first signal packet to obtain the type of the command and a first parameter indicating the working state of said memory card; switching the conducting direction between said host device and said memory card according to a direction switching information which is corresponding to said first parameter; receiving a second signal packet returned from said memory card; and detecting if switch the conducting direction between said host device and said memory card according to said second signal packet, and switching the conducting direction.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
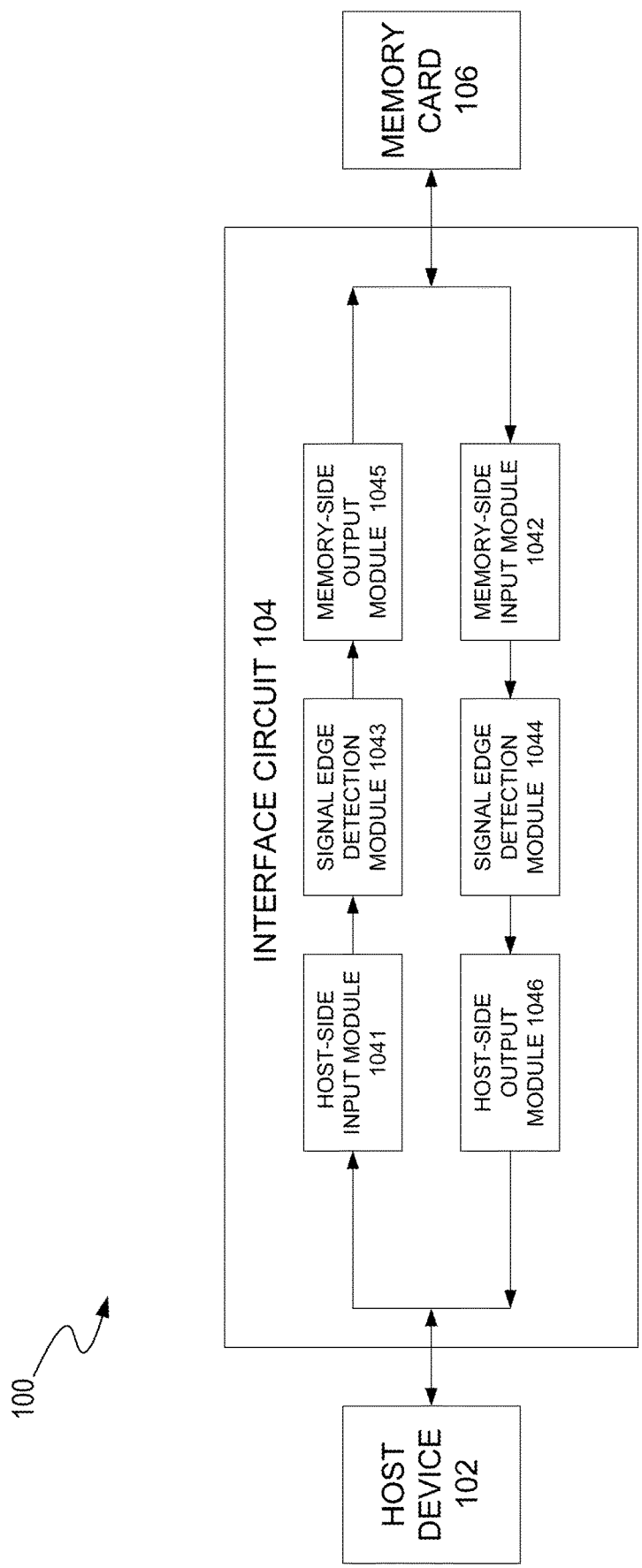
FIG. 1 shows a conventional interface circuit for providing communication between a host device and a memory card.
Figure 2:
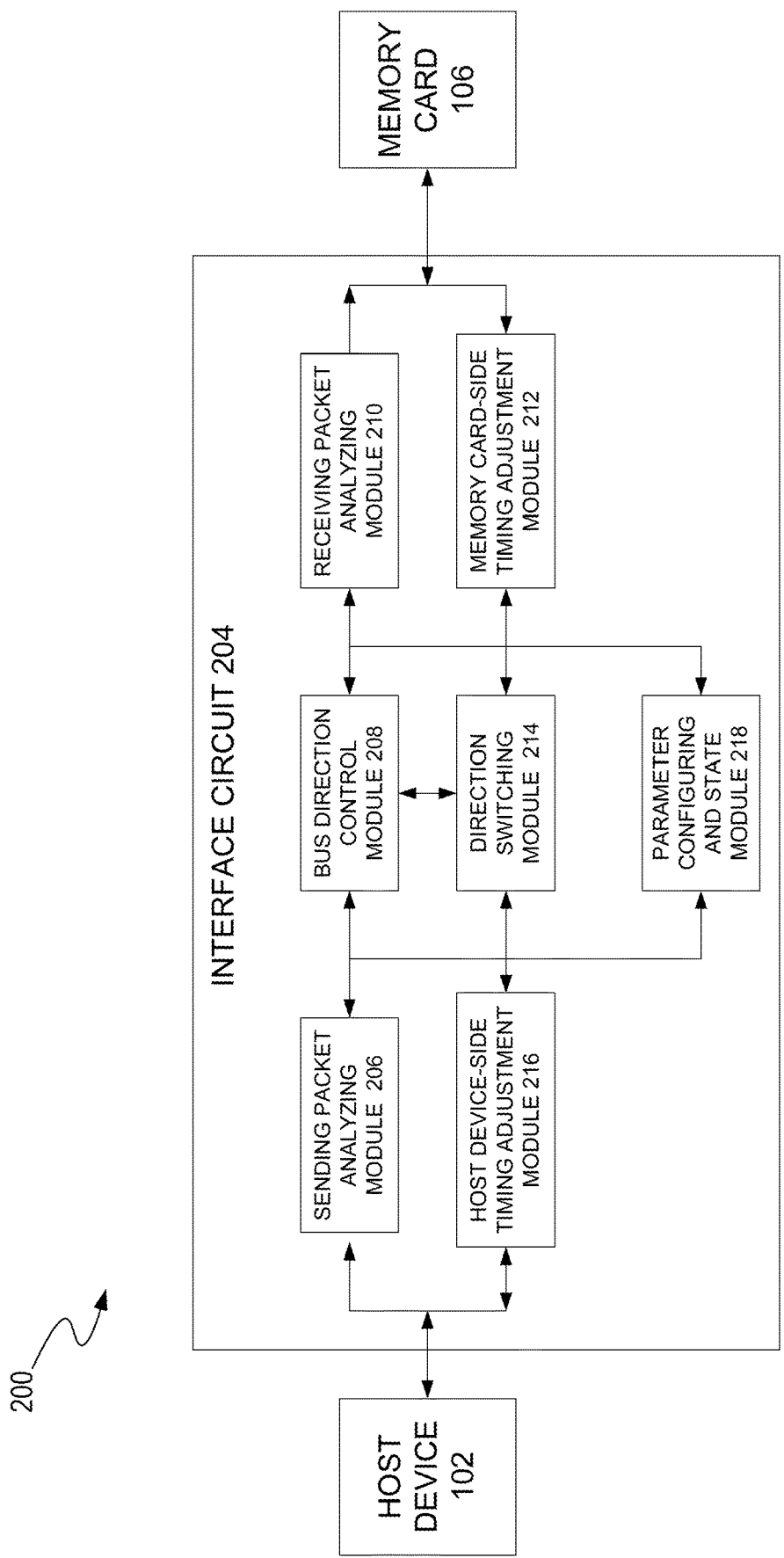
FIG. 2 shows an example of an interface circuit for providing communication between a host device and a memory card, in accordance with an embodiment of the present invention.

FIG. 2 shows an example of an interface circuit 204 for providing communication between a host device 102 and a memory card 106, in accordance with an embodiment of the present invention. The host device 102 and the memory card 106 uses a half duplex communication protocol based on interface circuit 204, and the interface circuit 204 is configured to switch direction of communication between the host device 102 and the memory card 106 by analyzing interface protocol. The host device can be, but is not limited to, an electronic device capable of reading data from or writing data to the memory card. By way of example, the electronic device may be a memory card controller chip, a memory card reader, or a digital camcorder. The interface circuit 204 transfers signals between a memory card and a host device. In one embodiment, the interface circuit 204 is included in a host device. Alternatively, in another embodiment, the interface circuit 204 can be included in a memory card.

The interface circuit 204 supports multiple transfer modes. The multiple transfer modes include, but are not limited to, a legacy mode, e.g., a high speed (HS) mode or ultra high speed I (UHS-I) mode, and an advanced mode, e.g., and ultra high speed II (UHS-II). The signal transfer in the advanced mode is at a greater speed than the signal transfer in the legacy mode. The signal transferred in the multiple transfer modes includes, but is not limited to, a data signal, a command signal, or a clock signal. In one embodiment, the data transfer in the advanced mode is at a greater speed than the data transfer in the legacy mode.

In one embodiment, as shown in FIG. 2, the interface circuit 204 includes a sending packet analyzing module 206, a bus direction control module 208, a receiving packet analyzing module 210, a memory card-side timing adjustment module 212, a direction switching module 214, a host device-side timing adjustment module 216 and a parameter configuring and state module 218. Where the sending packet analyzing module 206 analyzes a first signal packet sent from a host device 102, and obtains the current working state of the host device 102 and memory card 106. The current working state represents working mode and working frequency of the memory card 106, and diver information of the host device or the memory card. Further, the first signal packet includes, but is not limited to, a command signal, a data signal and first parameter information. Wherein the first parameter information represents, but is not limited to, working frequency of the memory card 106, and parameter information is required when the host device reads/writes data in the memory card, the working voltage of the input/output ports of the memory card. Wherein the first parameter information can be changed.

Specifically, the sending packet analyzing module 206 in the interface circuit 102 analyzes the first signal packet sent from the host device 102, and transmits the analyzed signal packet to the bus direction control module 208, where the first signal packet includes first parameter information. If the value of the first parameter information changes, the bus direction control module 208 will generates a first control signal based on the changes. Moreover, the first control signal represents conducting direction information of the direction switching module 214 which decides the conducting direction of the main pathway. In one embodiment, after receiving the first signal packet from the host device 102 by the memory card 106, the direction switching module 214 determines conducting direction of main pathway between the host device and the memory card. Compared with the prior art, as the interface circuit does not need to detect signal edges, only analyze or process the signal packet sent from the host device, and does not generate double driving as multi-pathway signal superposition. At the same time, the bus direction control module 208 instructs the direction switching module 214 to switch direction according to the first signal packet and timing requirements of memory card 106 during current working mode, i.e., the timing requirement of the memory card 106, i.e., interface of the memory card 106 (not shown in FIG. 2). More specifically, the timing requirement of the memory card 106 interface represents the phase relation between command/data in the first signal packet and the clock. Besides, the memory card 106 receives the first signal packet, the receiving packet analyzing module 210 receives a second signal packet returned from the memory card 106.

Further, when the direction switching module 214 receives the control signal, for example, the first control signal mentioned above, which represents direction switching information sent from the bus direction control module 208, and then outputs signal packet to the memory card 106 (for example, the first signal packet, output from the host device 102 to the memory card 106), wherein the timing requirement of the interface, including the host device interface and the memory card interface, is determined by the working mode of the memory card 106. Besides, the timing adjustment module, including memory card-side timing adjustment module 212 and the host device-side timing adjustment module 216, are configured to adjust output timing information according to a second parameter and a command information indicated the working mode of the memory card 106, to make sure the timing requirement of the host device 102 interface and the memory card 106 interface satisfying the specification. Thus, the signal transfers between the host device 102 and the memory card 106 correctly. In one embodiment, the second parameter represents a parameter which makes the memory card 106 satisfying the requirement of the working mode that is configured by the host device 102.

In one embodiment, the interface circuit 204 further includes a memory card-side timing adjustment module 212, a host device-side timing adjustment module 216 and a parameter configure and state module 218. Where the structure and function of the memory card-side timing adjustment module 212 is same as the host device-side timing adjustment module 216, both two of them are configured to adjust timing information to satisfy the specification according to kinds of working mode of the memory card 106, the second parameter which is configured to the memory card 106 by the host device 102. Where the second parameter satisfies to the working mode requirement of the memory card 106, and is configured by the host device 102. Specifically, the sending packet analyzing module 206 analyzes the working mode of the memory card 106, the memory card-side timing adjustment module 212 outputs timing which satisfies the specification according to the working mode of the memory card 106 and required timing of the interface. In one embodiment, the memory card-side timing adjustment module 212 can outputs timing which satisfies the specification according to clock signal, the second parameter and command/data signal with choose and logic operation, wherein the timing represents the relation between the command/data and the phase of the clock. Similarly, the host device-side timing adjustment module 216 adjusts timing that satisfies the specification of the host device 102 interface. The parameter configuring and state module 218 is configured to receive parameter information of the memory card 106 set by the host device 102, such as, store the second parameter, and the state information of each module in the interface circuit 204.

As illustrated above, the interface circuit 204 for providing communication between the host device 102 and the memory card 106, does not need to detect the changes of the signal, and samples the received signal and proceed the data as avoiding detect circuit to detect the signal edge. At the same time, when the interface (not shown in FIG. 2) of the host device 102 and/or the memory card 106 receive noise signals, the interface circuit 204 can avoid the interference of the noise signal as each module in the interface circuit 204 is not initiated and the interface is disabled. The method of adjusting timing disclosed in present invention can avoid mistakes of sampling result as time delay in each module and decreases of effective time window of the bus signal. In present invention, the timing information can be adjusted to satisfy the requirement of the interface circuit, and when the signal is transferred from one side to another side, for example, from the host device 102 to the memory card 106, the effective time window of the signal can be maintained in a suitable time range to make the signal is sampled correctly.

It should be understood by the person having ordinary skill in the art, the interface circuit 204 can be used in various applications such as digital camcorders, digital cameras, televisions, set top boxes, personal computers, mobile phones, SD cards, and SD card readers.

Figure 3:
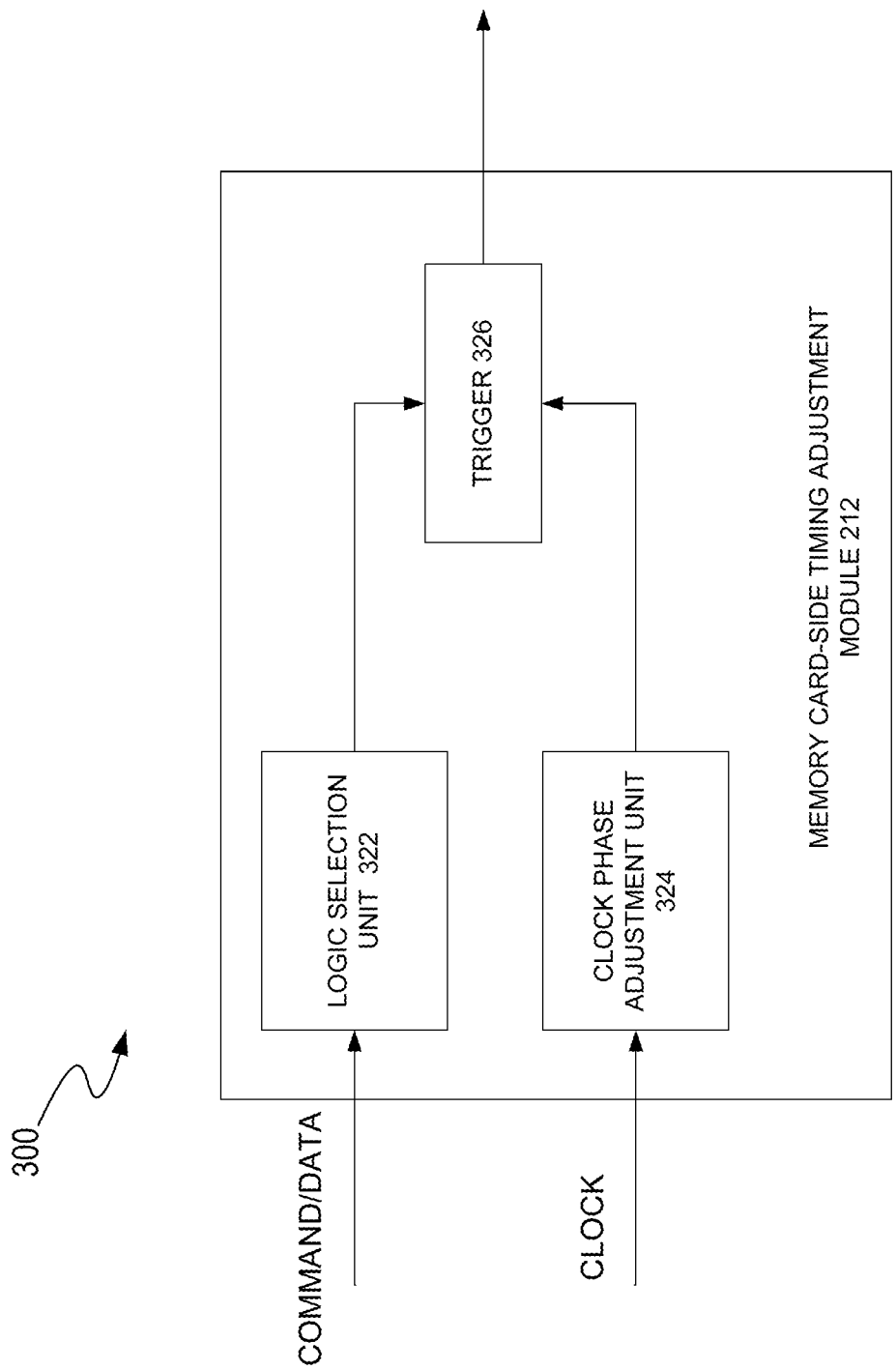
FIG. 3 shows a memory card-side timing adjustment module in an interface circuit in FIG. 2, in accordance with an embodiment of the present invention.

FIG. 3 illustrates a memory card-side timing adjustment module 212 in the interface circuit 204 in FIG. 2, in accordance with an embodiment of the present invention. FIG. 3 is described in combination with FIG. 2. As shown in FIG. 3, the memory card-side timing adjustment module 212 includes: a logic selection unit 322, a clock phase adjustment unit 324 and a trigger 326. The logic selection unit 322 receives the command and/or data signal, including multi-pathway command and/or data signals, hereafter multi-pathway signals. The logic selection unit 322 selects a signal from the multi-pathway signals corresponding to the working state of the memory card 106, i.e., corresponding command signal and/or corresponding data signal. The clock phase adjustment unit 324 receives clock signal and a second parameter of the memory card 106, and adjusts the clock signal according to the second parameter. The second parameter represents a parameter of the working mode required by the memory card 106 which the host device 102 configures to the memory card 106 according to the type of the memory card 106. Regarding to the detail method of configuring the parameter of the memory card 106, it has been disclosed in our company's previous patent application titled "An interface circuit, a signal transmission system and a method of configuring parameter" which is filed in SIPO (Application No. 2016105550168), and will be not illustrated as duplication.

Furthermore, the clock signal that has been adjusted combines with the command and/or data signal output from the logic selection unit 322 to the trigger 326. Specifically, the signal output from the trigger 326 is command signal and/or data signal under adjusting clock signal, also known as signal which satisfies the timing request of the specification, hereinafter a first timing signal. Wherein the first timing signal is generated by adjusting a clock signal in the first signal packet (for example, multiple command and/or data, and clock signal) received by the memory card-side timing adjustment module 212. At the same time, the host device-card timing adjustment module 216 returns a second signal packet, and outputs a timing signal which satisfies the timing request of the specification of the host device interface, hereinafter a second timing signal. Wherein the second timing signal is generated by adjusting a clock signal in the second signal packet. The function and structure of the host device-side timing adjustment module 212 is same as the memory card-side timing adjustment module 212, and method of adjusting the second timing signal is same as adjusting the first timing signal, and will be omitted herein.

One skilled in the art should be understood, the command signal mentioned above represents instructions and command used to control the memory card 106 by the host device 102, for example, including reading data from the memory card 106 or writing data into the memory card 106. The data signal represents information transferred between the host device 102 and the memory card 106, for example, texts, videos or any information stored on the memory card 106. The clock signal is generated by a clock generator in the host device, is used to synchronize clock of the host device 102 and the memory card 106 when the clock signal at the time of effective edge, i.e., at sampling time of the command signal and/or the data signal. Specifically, when the clock signal which has been adjusted generates jumps, i.e., the clock signal appears rising edge, the trigger 326 samples the level of the command and/or data signal. The command and/or data which is sampled in present invention have advantages of high accuracy and stable communication. As choosing the best clock phase, the data is sampled at an effective time window, thus, the interface circuit and the memory card can work stably.

Figure 4:
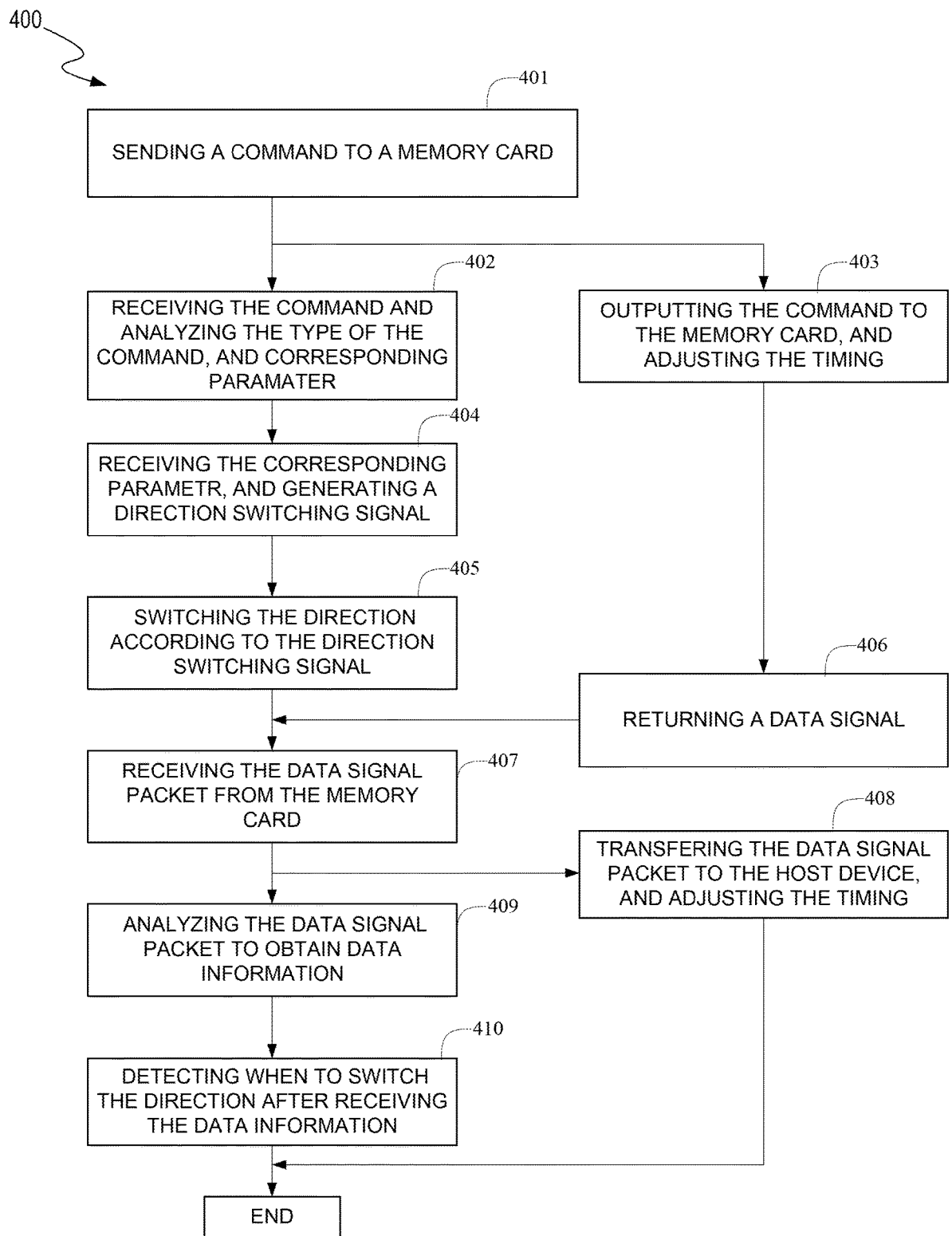
FIG. 4 shows a flowchart of an example of a method for providing communication between a host device to a memory card, in accordance with an embodiment of the present invention.

FIG. 4 shows a flowchart of an example of a method for providing communication between a host device 102 to a memory card 106, in accordance with an embodiment of the present invention. FIG. 4 is described in combination with FIG. 2. Although specific steps are disclosed in FIG. 4, such steps are examples. That is, the present invention is well suited to perform various other steps or variations of the steps recited in FIG. 4.

At step 401, the host device 102, e.g., a mobile phone, sends a first signal packet, including a command signal for reading the data from the memory card, data signal and clock signal sent from the host device. Specifically, the interface circuit 204 receives the first signal packet.

At step 402, the sending packet analyzing module 206 in the interface circuit 204 receives the first signal packet sent from the host device 102, and analyzes the type of the command and the first parameter corresponding to the working mode of the memory card 106. More specifically, the command and the first parameter include the working mode, work frequency of the memory card 106, and driving information of the host device 102 and the memory card 106, and so on.

The sending packet analyzing module 206 send the analyzed command signal, data signal and corresponding first parameter to the bus direction control module 208. At step 404, after receiving the corresponding first parameter, the bus direction control module 208 combines the first parameter with the first signal packet to generate a first control signal for switching direction.

Meanwhile, the first signal packet from the host device 102 sends to the memory card 106 via the direction switching module 214, as shown at step 403, and the memory card-side timing adjustment module 212 adjusts the clock signal in the first signal packet to output a first timing signal. After the memory card 106 receiving the first signal packet from the host device 102, performing step 406, i.e., the memory card 106 returns the second signal packet to the receiving packet analyzing module 210.

At step 405, the direction switching module 214 receives the first control signal sent from the bus direction control module 208, where the first control signal includes information indicating the conducting direction information, and the direction switching module 214 switches the direction according to the conducting direction information. Specifically, the direction switching module 214 detect if has received the first signal packet before switching the direction. In other words, the direction switching module 214 only switches the direction according to the conducting direction information when the memory card 106 has received the first signal packet.

At step 407, the receiving packet analyzing module 210 receives a second signal packet from the memory card 106.

At step 408, the second signal packet is transferred to the host device 102 via the direction switching module 214, and the host-side timing adjustment module 216 adjusts a timing signal in the second signal packet, and output a second timing signal. At step 409, the receiving packet analyzing module 210 analyzes the second signal packet to obtain the working state of the memory card 106, and bus direction control module 208 is coupled to the receiving packet analyzing module 210 to generate a second control signal, and send the second control signal to the direction switching module 214.

At step 410, the direction switching module 214 detects when to switch direction after receiving the second control signal. Specifically, when the direction switching module 214 receives the data information from the receiving packet analyzing module 210 and the host device 102 receives the second signal packet, the direction switching module 214 switches the direction.

It should be understood that the order of step 408 and step 409 can be changed. The host-side timing adjusting module 216 outputs the timing signal, i.e., the second timing signal to the host device 102.

While the foregoing description and drawings represent embodiments of the present invention, it will be understood that various additions, modifications and substitutions may be made therein without departing from the spirit and scope of the principles of the present invention. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, and not limited to the foregoing description.

What is claimed is:

1. An interface circuit provides communication between a memory card and a host device, said host device and said memory card uses a half duplex communication protocol based on said interface circuit, and said interface circuit configured to switch direction of communication between said host device and said memory card by analyzing interface protocol, said interface circuit comprising:
   a sending packet analyzing module, configured to receive a first signal packet from said host device, and obtain working state of said host device and said memory card by analyzing said first signal packet;
   a bus direction control module, coupled to said sending packet analyzing module, configured to generate a first control signal according to a first parameter in said first signal packet, wherein said first signal packet includes conducting direction information between said host device and said memory card;
   a direction switching module, coupled to said bus direction control module, configured to turn on pathway between said host device and memory card according to said first control signal; and
   a timing adjustment module coupled to said direction switching module, configured to adjust a clock signal in said first signal to satisfy interface-timing requirement, where the interface-timing requirement represents the relation between a command/data and a clock phase, and is determined by the current working state and working frequency of the memory card, wherein said memory card receives the first signal packet from said host device and returns a second signal packet to said host device after receiving the clock signal, said interface circuit further includes a receiving packet analyzing module configured to receive said second signal packet from said memory card and obtain a working state of said memory card by analyzing said second signal packet, said bus direction control module generates a second control signal which includes conducting direction information between said host device and said memory card, and said direction switching module to switch the direction of communication between said host device and said memory card according to said conducting direction information;

wherein said timing adjustment module includes a clock phase adjustment unit, configured to adjust phase of the clock signal according to said clock signal and a second parameter, where the second parameter is set as the type of memory card and working mode by the host device.

2. The interface circuit of claim 1, wherein said timing adjustment module further includes a trigger, configured to receive said first signal packet which includes the command/data signal, and receive the clock signal which the phase of the clock signal has been adjusted, and output clock signal which satisfies interface-timing requirement, where the interface-timing requirement represents the relation between the command/data and the phase of the clock signal.

3. A signal transmission system includes a host device, an interface circuit and a memory card, said host device and said memory card uses a half duplex communication protocol based on said interface circuit, and said interface circuit configured to switch direction of communication between said host device and said memory card by analyzing interface protocol, where the host device sends a first signal packet to said interface circuit for analyzing;

the interface circuit coupled to said host device, configured to analyze said first signal packet to obtain a conducting direction information between said host device and said memory card, where said interface circuit includes:

a sending packet analyzing module, configured to receive said first signal packet from said host device and obtain the working state of said host device and said memory card by analyzing said first signal packet;

a bus direction control module, coupled to said sending packet analyzing module, configured to generate a first control signal according to a first parameter in said first signal packet, wherein said first signal packet includes conducting direction information between said host device and said memory card;

a direction switching module, coupled to said bus direction control module, configured to turn on pathway between said host device and memory card according to said first control signal;

a timing adjustment module coupled to said direction switching module, configured to adjust a clock signal in said first signal to satisfy interface-timing requirement, where the interface-timing requirement represents the relation between a command/data and a clock phase, and is determined by the current working state and working frequency of the memory card, and the memory card returns a second signal packet to said interface circuit after receiving the clock signal, wherein said interface circuit further includes a receiving packet analyzing module configured to receive said second signal packet from said memory card and obtain a working state of said memory card by analyzing said second signal packet, said bus direction control module generates a second control signal which includes a conducting direction information between said host device and said memory card, and said direction switching module to switch the direction of communication between said host device and said memory card or not according to said conducting direction information;

wherein said timing adjustment module includes a clock phase adjustment unit, configured to adjust phase of the clock signal according to said clock signal and a second parameter, where the second parameter is set as the type of memory card and working mode by the host device.

4. The signal transmission system of claim 3, wherein said timing adjustment module further includes a trigger, configured to receive said first signal packet which includes the command/data signal, and receive the clock signal which the phase of the clock signal has been adjusted, and output clock signal which satisfies interface-timing requirement, where the interface-timing requirement represents the relation between the command/data and the phase of the clock signal.

5. A method for providing communication between a host device and a memory card, including:

sending a first signal packet from said host device to said memory card;

said memory card receiving the first signal packet from said host device;

analyzing said first signal packet to obtain a type of a command and a first parameter indicating a working state of said memory card;

adjusting a first timing signal of said memory card in the first signal packet sent from said host device, comprising adjusting phase of the first timing signal according to said first timing signal and a second parameter, to satisfy interface-timing requirement, where the interface-timing requirement represents the relation between a command/data and a clock phase, and is determined by the current working state and working frequency of the memory card, and where the second parameter is set as the type of memory card and working mode by the host device;

switching a conducting direction between said host device and said memory card according to a direction switching information which is corresponding to said first parameter;

said memory card returning a second signal packet to said host device after receiving the first timing signal;

receiving the second signal packet returned from said memory card and obtaining a working state of said memory card by analyzing said second signal packet;

generating a second control signal including a conducting direction information between said host device and said memory card, and switching the conducting direction between said host device and said memory card according to said second signal packet.

6. The method for providing communication between a host device and a memory card of claim 5, further including: adjusting a second timing signal of said host device in the second signal packet returned from the memory card.

\* \* \* \* \*